Oct. 4, 1966 A. E. CONIA 3,276,155

INDEXES FOR TELEPHONE NUMBERS

Filed April 17, 1964 5 Sheets-Sheet 2

INVENTOR
ANDRÉ EDOUARD CONIA
By: McGlew and Toren,
Attorneys

INVENTOR
ANDRÉ EDOUARD CONIA
By: McGlew and Toren,
Attorneys

Oct. 4, 1966 A. E. CONIA 3,276,155

INDEXES FOR TELEPHONE NUMBERS

Filed April 17, 1964 5 Sheets-Sheet 3

INVENTOR
ANDRÉ EDOUARD CONIA
By: McGlew and Toren,
Attorneys

INVENTOR
ANDRÉ EDOUARD CONIA
By: McGlew and Toren,
attorneys

INVENTOR
ANDRÉ EDOUARD CONIA
By: McGlew and Toren,
Attorneys

United States Patent Office 3,276,155

Patented Oct. 4, 1966

3,276,155

INDEXES FOR TELEPHONE NUMBERS

André Edouard Conia, 15 Avenue du General Leclerc, Boulogne-sur-Seine, France

Filed Apr. 17, 1964, Ser. No. 360,725
Claims priority, application France, Apr. 19, 1963, 931,984
16 Claims. (Cl. 40—65)

Figure 3:
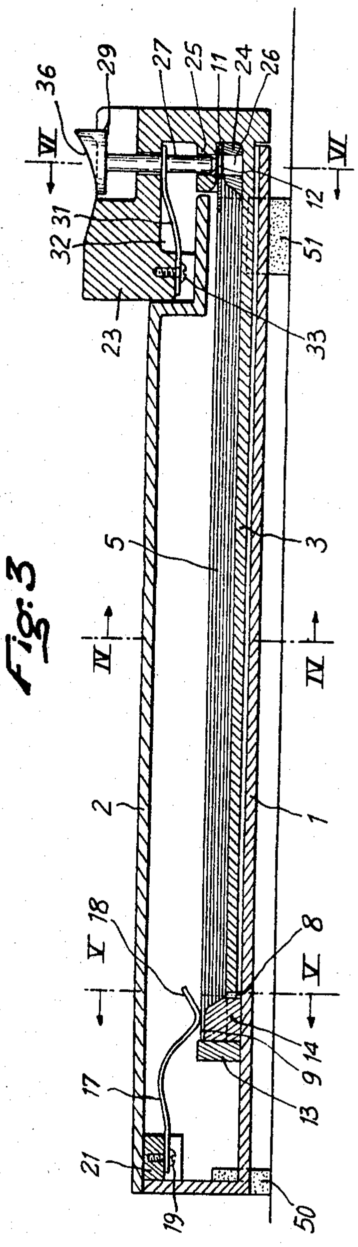

The present invention relates to improvements in indexes for telephone numbers.

Such indexes are already known comprising a stack of superimposed cards on which the numbers are written, which are kept in a case provided with a sliding member and selection keys permitting a desired card to be selected from the cards in the stack and the cards selected to be displayed drawing the sliding member out of the case.

The object of the invention is to improve the indexes of the type described by simplifying their construction, improving their action and making them capable of operating in any position, e.g. flat, cantilevered, vertical or any other position.

For this purpose, the device according to the invention, comprises, in combination, registration cards located in a drawer and each provided with a rear holding tab and a front operating tab, keys adapted to cooperate selectively with the said front operating tabs, and holding means acting on the said rear holding tabs. According to a further characteristic of the invention, the drawer is combined with locking means which secure it in its open position, as well as with return means which effect the automatic return of the drawer ino the case when the drawer is released before it has been fully pulled out or when the locking means have been released.

According to another feature of the invention, the holding tabs are substantially identical in shape but are staggered, on the individual cards, in such a manner that they form an inclined plane, the holding means being formed by resilient members which act on the upper faces of the said tabs in such a manner as to apply their lower faces against an abutment member having a corresponding inclined surface.

According to another feature of the invention, the resilient holding means act on the holding tabs through a roller which is capable of only limited angular movement.

According to another feature of the invention, the operating tabs are formed by small perforated tongues which are substantially identical but are staggered in the transverse direction from one card to the next, in such a manner that they form an inclined plane, the upper and/or lower surfaces of the said small tongues cooperating with abutment and guiding members having a corresponding inclination, the selection keys comprising a supplementary portion adapted to enter the perforation of the small tongue of the corresponding card.

According to another feature of the invention, the keys cooperate with means for preventing their rotation and their upper face is inclined downwardly from front to rear in such a manner as to form a gripping surface facilitating the withdrawal of the drawer from the casing.

According to another feature of the invention, the operating tabs of the cards are formed by complete small tongues which are acted upon by the selection keys through pressing and retaining members.

According to another feature of the invention, the pressing members are part of a resiliently deformable assembly which is mounted in the casing between the selection keys and the operating tabs.

According to another feature of the invention, the pressing members are formed by separate pieces which are individually mounted on the selection keys.

According to another feature of the invention, the end of the travel of the drawer back into the case is slowed down by damping means.

According to another feature of the invention, the case containing the drawer for the index can be combined with other cases containing auxiliary drawers capable of receiving various accessories, such as note pads, diaries, card indexes and the like.

Figure 2:
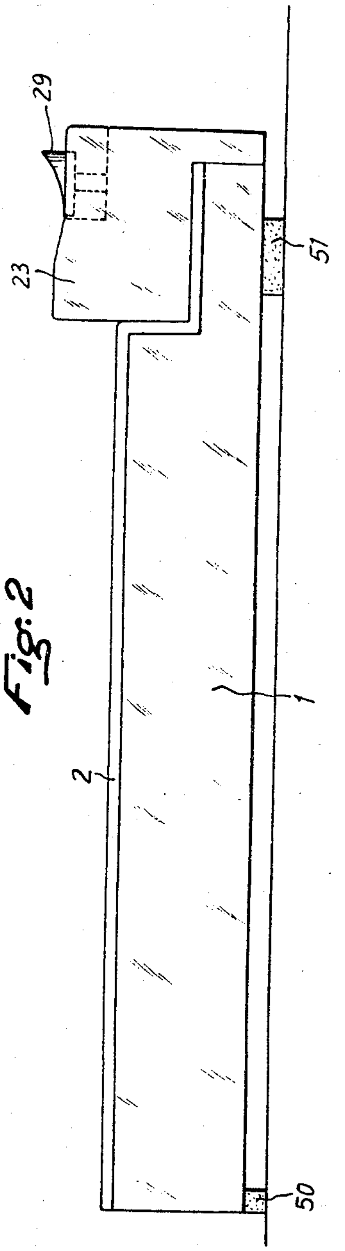
Figure 1:
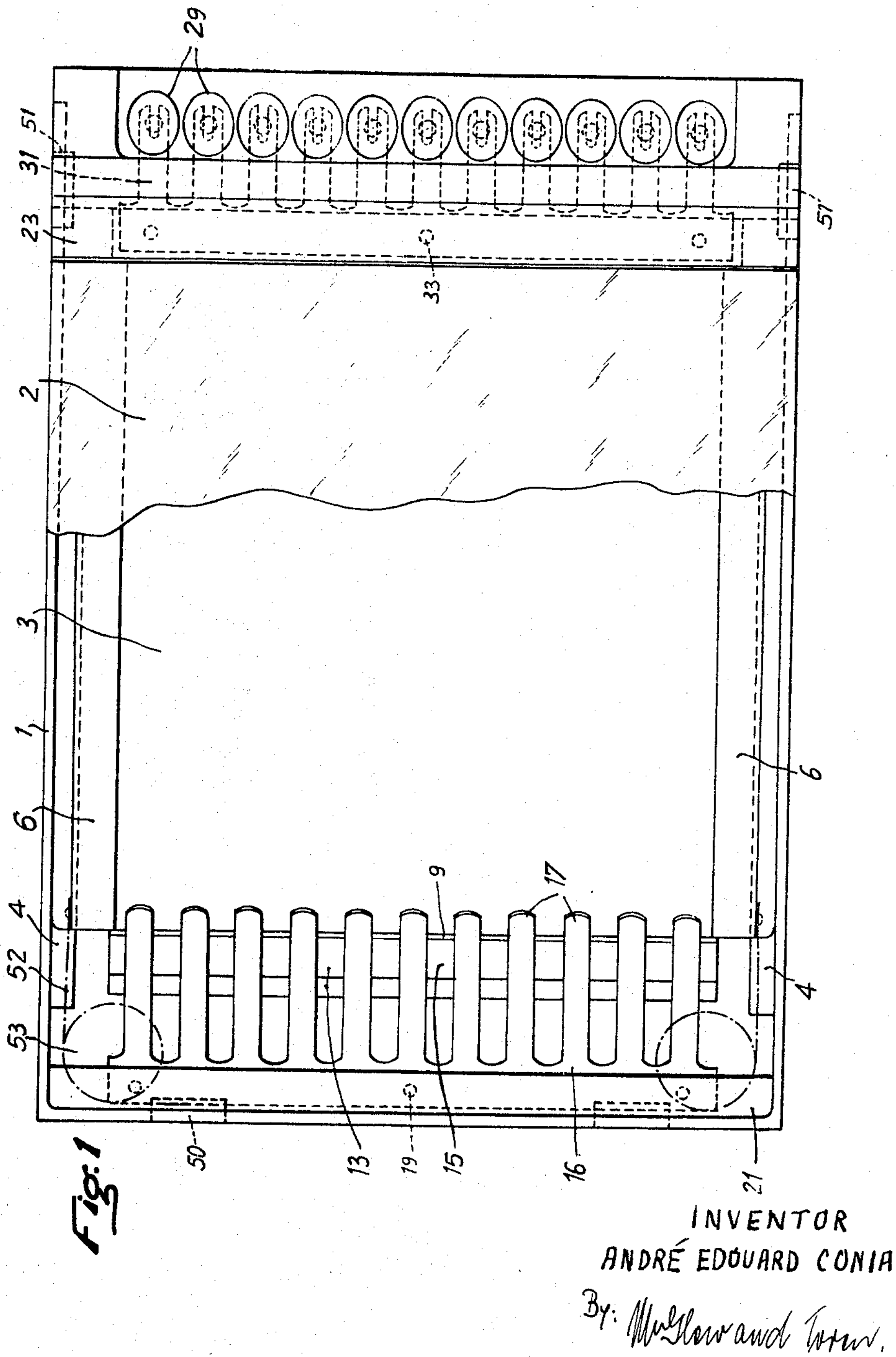
Figure 4:
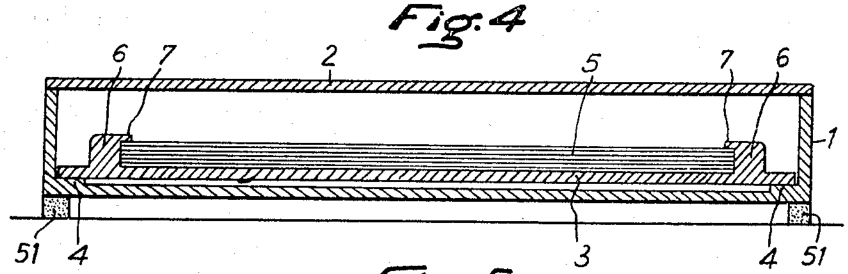
Figure 5:
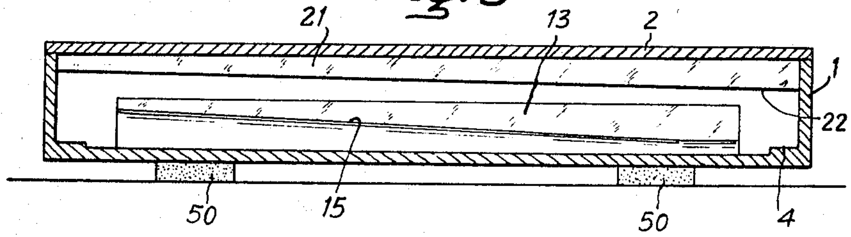
Figure 6:
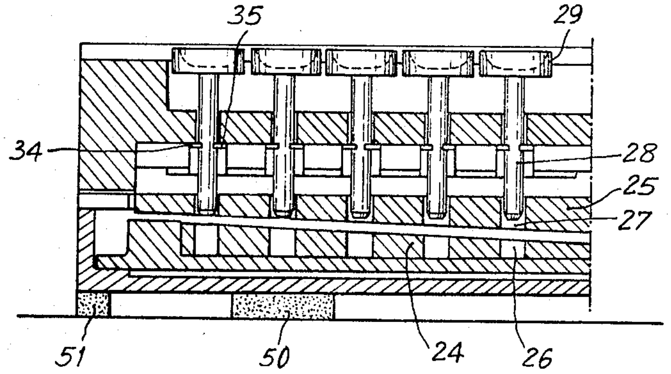
Figure 7:
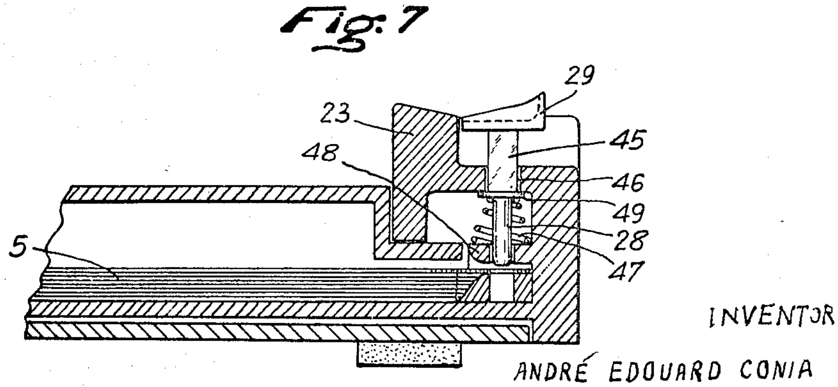
Figures 8, 9, 10:
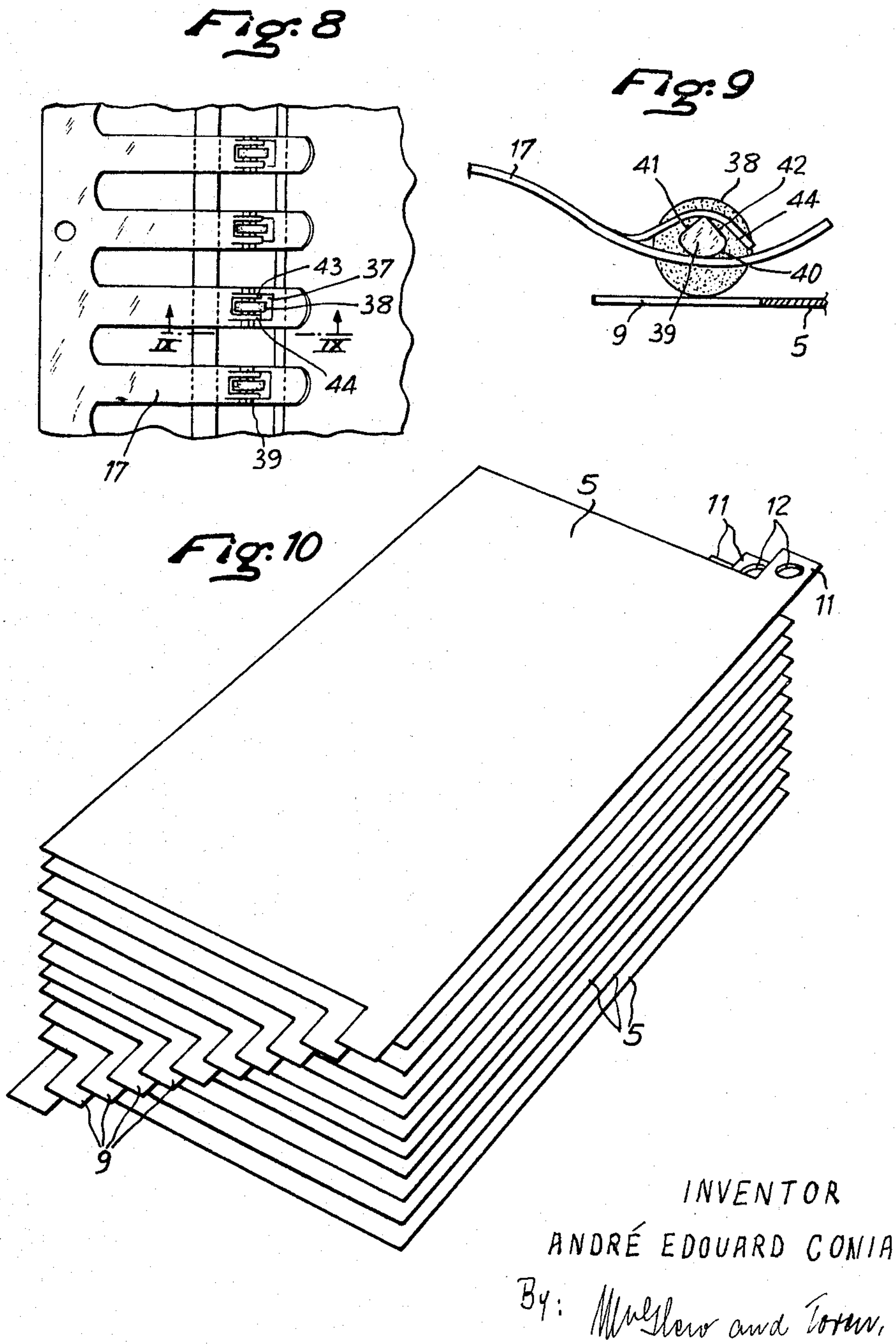
Figure 11:
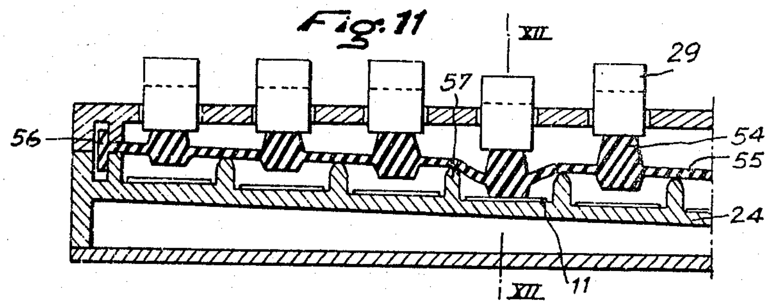
Figure 12:
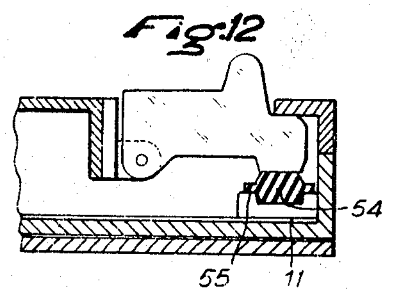
Figure 13:
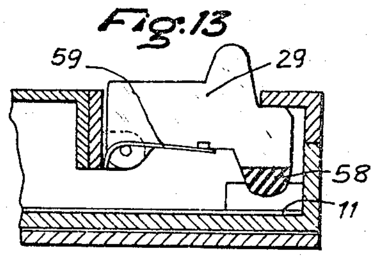
Figure 14:
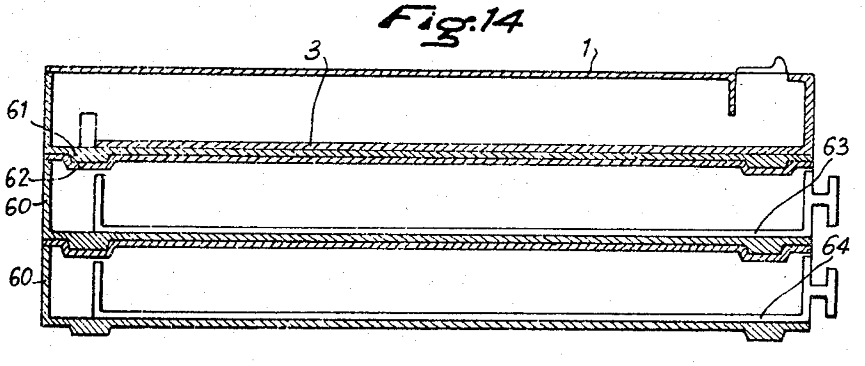
Figure 15:
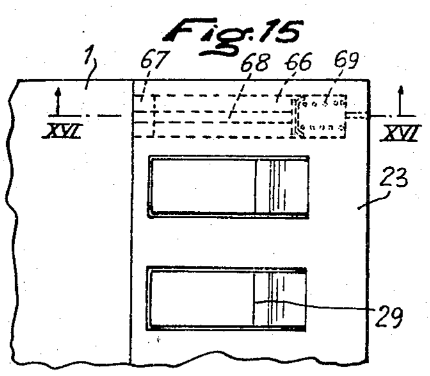
Figure 16:
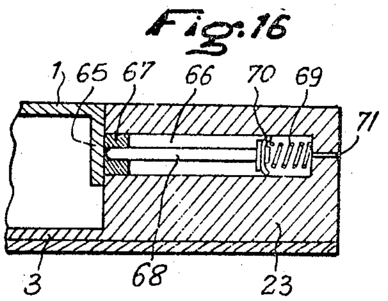

Embodiments of the invention will now be described with reference to the accompanying drawings, in which:

FIG. 1 is a plan view of an index according to the invention, in partial section, FIG. 2 is an elevational view, FIG. 3 is a longitudinal section, on the line III—III of FIG. 1, FIG. 4 is a transverse section on the line IV—IV of FIG. 3, FIG. 5 is a transverse section on the line V—V of FIG. 3, with the cards and rear spring removed, FIG. 6 is a section on the line VI—VI of FIG. 3, FIG. 7 is a view corresponding to FIG. 3 of an alternative form of keys, FIG. 8 is a partial plan view showing the rear retaining means, on a larger scale, FIG. 9 is a partial section on the line IX—IX of FIG. 8 on a larger scale, FIG. 10 is a perspective view of a stack of cards, the individual cards being separated from one another for greater clarity, FIG. 11 is a view similar to FIG. 6 of a portion of an alternative key assembly or key board, FIG. 12 is a view of a detail in section on the line XII—XII of FIG. 11, FIG. 13 is a view similar to FIG. 12 but showing an alternative construction, FIG. 14 is a longitudinal sectional view of an embodiment of the index superimposed on a stack of auxiliary drawers, FIG. 15 is a fragmentary plan view showing the damping means for the drawer return, and FIG. 16 is a section on the line XVI—XVI of FIG. 15.

In the drawings, 1 denotes a case covered by a cover 2. A drawer 3 is slidably mounted on guides 4 formed in the case 1. This drawer serves to receive a stack of cards 5 on which the telephone numbers are recorded. The side edges of the cards 5 are guided by the lateral surfaces 6 of the drawer 3, which are provided with flanges 7 which retain the uppermost card of the stack. The rear end of the drawer 3 is open and its end abuts in the closed position shown in FIG. 3 against an abutment 8 secured to the bottom of the case 1.

Each registry card 5 (see FIG. 10) comprises a rear holding tab 9 and a front operating tab 11 formed with a perforation 12, the purpose of which will be explained later.

The holding tabs 9 of the individual cards have substantially the same shape but are staggered from one card to the next in such a manner that together they define an inclined plane.

The holding tabs 9 cooperate at their edge with stop member 13 secured to the box 1 and by their lower faces with an abutment member 14 whose abutment surface 15 has an inclination corresponding to the inclined plane defined by the tabs 9 (see FIG. 5).

The cards 5 are held in their withdrawn position shown in FIG. 3, by holding members which hold the tabs 9 against the abutment member 14. In the embodiment illustrated, the holding member is formed by a spring 16 forming teeth 17, intended to cooperate with the tabs 9 of the cards and bent (see FIG. 3) in such a manner as to urge the tabs 9 against the abutment member 14, while permitting relative movement of the card when the latter is selected. To this end the foremost end 18 of each tooth 17 is raised to enable the tab 9 of the selected card to engage under the tooth 17 when the card is pushed home into the case.

Just as described above, the tabs 9 and their abutment surface 15 are arranged on an inclined plane, the spring 16 and its teeth 17 are inclined in a corresponding manner. To this end the spring 16 is fixed by screws 19 to a support 21 having an inclined bearing surface 22.

The forward end of the drawer 3 is shaped as a head 23 or carries such a head. This head comprises firstly lower and upper supports 24 and 25 respectively for the operating tabs 11 of the cards, the range of these abutments occupying an inclined position corresponding to the stagger arrangement of the operating tabs (see also FIG. 6).

The supports 24 and 25 are provided with coaxial balls 26 and 27 respectively which are intended to guide shafts 28 carrying the keys 29 of which the number corresponds to the number of individual cards 5. The balls 26 and 27 are also coaxial with the perforations 12 in the operating tabs 11 of the cards, so that the shaft 28 is engaged therein when the corresponding button 29 is pressed against a return spring 31 located in an opening 22 of a head 23 to which it is fixed by a screw 33.

As it is apparent from FIG. 6, a forward end of the spring 31 is forked so as to form two tongues 34 and 35 engaged in corresponding saw-cuts formed in the shaft 28 of the key 29 so as to prevent rotation of the latter. The upper surface 36 provided with letters characteristic of the registry card associated with the key under consideration, is inclined from front to rear so as to constitute a gripping surface facilitating the withdrawal of the drawer 3 from the case 1.

The case 1 is provided with feet 50 and 51 serving either to support it on a support surface of or assembling it with other similar cases.

The drawer 3 is returned to its closed position by a return device similar to the return device of typewriter carriages and comprising a barrel 53 containing a spring 52 of which the free end is fixed to the drawer 3. A device (not shown) may be provided for locking the drawer 3 automatically in its open position.

The above device operates as follows:

In the inoperative position, all the components occupying positions shown in FIGS. 1 to 3, that is to say the drawer 3 is entirely engaged in the case 1, the holding tabs of all the cards 5 raised on the abutment surface 15 against which they are clamped by the teeth 17 of the spring 16 and all the keys 29 are held in their upper position by their spring 31.

To select any card, one depresses the key 29 carrying the letters corresponding to the card to be selected. This lowering of the key makes its shaft 28 penetrate the perforation 12 of the operating tab 11 of the selected card.

One then pulls the drawer free out of the case, this being facilitated by the contact of the finger with the upper inclined surface 36 of the depressed key. During this downward movement of the drawer 3 from the case, the card 5 of which the perforation 12 is traversed by the shaft 28 of the corresponding key is withdrawn from the stack of the other cards which remain held in the interior of the case since their holding tabs are clamped against the abutment member 14 by the spring teeth 17.

It is clear from the preceding description that only the selected card is drawn out of the case while the other cards remain in the interior of the latter. Moreover, it is to be noted that in contrast to the known apparatus of this type, the operation of the cards takes place at their forward end, while their rear end is held and this simplifies the construction of the apparatus on the one hand and enables it to be used in any position, such as flat, cantilevered or vertical, on the other hand.

In order to return the device to its inoperative position, one releases the depressed key which is then returned, by the spring 31, to its uppermost position in which its shaft 28 is freed from the selected card. Then after disengagement of the locking means for the drawer 3, the latter is returned automatically by the return means 51–52, taking with it the exposed card of the stack of cards and replacing the holding tab of the latter on the abutment member 14 and under the corresponding spring tooth 17.

FIGS. 8 and 9 show an alternative holding arrangement acting on the holding tabs 9. The spring teeth 17 are cut in such a manner as to form an opening 37 which receives a roller 38 provided with an eccentric axle 39 whose section is defined by a curved segment 40 and two straight segments 41 and 42 forming an angle between them and with the curved segment 40. This axle is confined between the upper face of the spring tooth 17 and two small tongues 43, 44 which are cut out at the same time as the opening 37.

In this embodiment, these rollers 38 are applied by the spring teeth 17 against the holding tab 9 of the appropriate card. In the stowed position shown in FIG. 9, the axle 39 of the roller 38 bears at its underside by means of its segment 40 and at its upper edge by the line of intersection of the straight segments 41 and 42. The roller can then turn quite freely. However, after having turned through a certain angle, the straight segment 41 or 42 bears against the tongues 43 and 44 so that the rotation of the roller 38 is arrested. This arrangement facilitates the holding of the non-selected cards and the return of the selected card into its initial position. In fact, if the non-selected cards are drawn for a certain distance by friction when the drawer is pulled out of the case, the arresting of the rotation of the roller 38 after a certain angle of rotation holds the non-selected cards in the case. On the other hand, during the return of a selected card, the tab 9 on the card releases the roller 38 which then turns freely thereby permitting the return of the tab 9 to its proper position.

FIG. 7 shows an alternative form of the selection keys. In this embodiment, each key 29 is provided with a square shank 45 which is guided in an opening 46 of corresponding form formed in the head 23 of the drawer. This shank 45 terminates in the shaft 28 which is intended to cooperate with the perforation 12 of the selected card. The return o fthe key to its uppermost position is ensured by a helical spring 47 of conical form which bears at one end against a shoulder 48 in the head 23 and at its other end against a washer 49. In this embodiment, the rotation of the key is prevented by the engagement of the square shank 45 in the corresponding opening 46.

In the embodiments described above, the operating tabs of the register cards are operated by shafts on the selection keys which penetrate into corresponding holes provided in the said operating tabs. However, this operation could result eventually in damage to the tabs particularly if for some reason the drawer should not return exactly to its closed position.

FIGS. 11 and 12 show a modification which enables this disadvantage to be avoided. For this purpose the operating tabs 11 are unperforated and are acted on by their corresponding keys 29 through pressure members 50, for example of rubber, which are capable of holding the operating tabs in question when they are applied against it by lowering of the corresponding key 29.

In the embodiment shown in FIGS. 11 and 12 of the pressure members 54 are assembled together by means of a resiliently deformable element 55 formed for example by a strip of rubber or other elastomer whose ends are fixed in the head of the drawer as shown at 56.

In order to limit the action of a selection key when depressed to operating only the selected card, partitions 57 are provided between the different friction members 54. The effect obtained by this arrangement is represented by the second key from the right in FIG. 11.

In this embodiment, the return of the keys 29 to their inactive position is effected by the resilience of the element 55.

FIG. 13 shows a modification in which each key 29 is provided with an individual pressure member 58 acting in the same manner as the members 54 of the previous embodiment. However, in this embodiment, the return of the keys 29 must be ensured by a blade spring 59 or an helicoidal spring.

FIG. 14 shows a combination of the case 1 containing the drawer 3 of a directory or index with auxiliary drawers 63, 64 which are capable of holding various accessories such as note pads, and/or diaries and/or card indexes, etc.

In the embodiment illustrated, the auxiliary drawers 63, 64 are located in independent cases 60, the assembly of these cases 60 to each other and to the case 1 being effected by means of complementary portions 61, 62 which rest with each other.

However, the case 1 of the index could be arranged in such a manner as to form the cases 60 intended to receive the auxiliary drawers 63, 64.

It may be useful to slow up the return travel of the drawer 3 when the latter is effected by automatic return means, for example, the means 52, 53 in FIG. 1.

To this end, the case 1 comprises an edge 65 (FIG. 16) and the block 23 carrying the keys 29 is provided with a bore 66 including a guide element 67 for a stem 68 carrying a small piston 70 subjected to the action of a compression spring 69.

The end of the cylindrical chamber 66 in which the spring is mounted is formed with a small orifice 77 which connects it with the interior, thus permitting air to enter and leave it. When the drawer is drawn out of the case to enable a card to be consulted, the block 23 leaves the edge 65 so that the spring 69 pushes out the stem 68 from the bore 66 and air is drawn into the space containing the spring 69.

When the drawer 3 returns under the action of its return means, the projection stem 68 comes towards the end of the return travel into contact with the edge 65 which causes compression of the spring 69 and discharge of air through the small orifice 71 and thus slowing up of the end of the travel.

The dash pot or similiar slowing device can be provided either on the axis of the case or on both sides of the axis or in any other suitable position.

It will be understood that the embodiments described above and illustrated in the drawings are given merely by way of simple non-limiting examples and it is therefore apparent that the shape, nature arrangement and assembly of their elements may be modified in any suitable manner without thereby departing from the limits of the invention. Thus the return spring 31 for the key could have its end opposite to the key fixed in front of the key and not behind it as shown in FIG. 3, which would enable the entire surface of the cards to be used of which a part is masked by the head 23 in the embodiment of FIG. 3. As far as the return means for the drawer is concerned, it comprises as well as a metal spring provided a system composed of two elastics of the kind "sandow." Moreover, the cover 2 of the case could be arranged to form a support for a telephone. It is also possible to assemble together several assemblies of the type shown which would permit the location of a greater number of register cards. Furthermore, the front and rear tabs of the cards could be reinforced. Moreover, these cards could receive information other than telephone numbers.

What is claimed is:

1. An index comprising a casing, a drawer mounted in said casing for sliding movement between a closed and an open position, a stack of register cards in said drawer, each of said cards having a rear holding tab and a front operating tab, a set of selection keys mounted in the front end of said drawer, each one of said keys corresponding to a different one of said cards, operating means associated with each of said keys to engage the operating tab of the corresponding card when the corresponding key is depressed, said card being thereby constrained to move with said drawer and releasable holding means in said case for releasably holding the holding tabs of said cards in the withdrawn position of said drawer.

2. An index according to claim 1, wherein the drawer is provided with automatic return means urging said drawer to be closed position.

3. An index according to claim 2, and including locking means for locking said drawer in the open position.

4. An index according to claim 1, wherein said holding tabs are staggered so as to lie in an inclined plane and said holding means comprise resilient members urging said tabs into frictional contact with a correspondingly inclined abutment member in said case.

5. An index according to claim 4, wherein the holding tabs of all the cards have substantially the same shape.

6. An index according to claim 4 and including rollers urged by the resilient members onto the holding tabs, said rollers being rotatable only through a limited angle.

7. An index according to claim 1, wherein the operating tabs are formed by small perforated tongues, said small tongues are staggered transversely of said drawer and each key includes a shank portion adapted to enter the perforation of the corresponding card operating tab when said key is depressed.

8. An index according to claim 7 and including an abutment member in said drawer having an inclined abutment surface adapted to support said operating tabs.

9. An index according to claim 8, wherein said abutment member is formed with a bore corresponding to each key and adapted to receive the key shank of the corresponding key when said key is depressed.

10. An index according to claim 1, including means for preventing rotation of said keys, wherein the upper surface of each of said keys is inclined downwardly and rearwardly to form a gripping surface.

11. An index according to claim 1, including an abutment member in said drawer and adapted to support said operating tabs, wherein said operating means include friction members adapted to frictionally engage the operating tab of a card when the corresponding key is depressed.

12. An index according to claim 11, wherein said friction members form a continuous resiliently deformable strip extending over the width of the drawer.

13. An index according to claim 12, wherein said abutment member carries partition ribs to space said friction members from said operating tabs except when the corresponding key is depressed.

14. An index according to claim 11, wherein said friction members are separate and are carried by their corresponding keys.

15. An index according to claim 2, and including damping means for slowing up the drawer towards the end of its return travel.

16. An index according to claim 1, wherein said case is adapted to nestably engage with a lower case including a drawer for accessories.

References Cited by the Examiner

UNITED STATES PATENTS

| | | | |
|---|---|---|---|
| 2,423,645 | 7/1947 | Fahlstedt | 129—16.1 |
| 2,968,110 | 1/1961 | Quanstrom | 40—104 |
| 3,167,371 | 1/1965 | Parcher et al. | 129—16.1 |

EUGENE R. CAPOZIO, *Primary Examiner.*

W. J. CONTRERAS, *Assistant Examiner.*